(12) United States Patent
Still

(10) Patent No.: US 6,191,712 B1
(45) Date of Patent: Feb. 20, 2001

(54) CIRCUIT FOR ALIGNING LOGICAL SECTORS WITH PHYSICAL SECTORS IN A DISK STORAGE SYSTEM

(75) Inventor: Charles Lee Still, Louisville, CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/340,376

(22) Filed: Jun. 28, 1999

(51) Int. Cl.[7] ...................................................... H03M 7/00
(52) U.S. Cl. ............................................................. 341/95
(58) Field of Search .......................... 341/95, 67; 710/69; 348/404; 711/112

(56) References Cited

U.S. PATENT DOCUMENTS

| | | |
|---|---|---|
| 5,596,458 | 1/1997 | Emo et al. . |
| 5,671,439 | 9/1997 | Klein et al. . |
| 5,765,201 | 6/1998 | Manges et al. . |
| 5,802,584 | 9/1998 | Kool et al. . |
| 5,813,025 | 9/1998 | Murphy et al. . |
| 6,092,130 * | 7/2000 | Horiike ................................... 710/69 |
| 6,119,201 * | 9/2000 | Kulakowski et al. ................ 711/112 |

* cited by examiner

Primary Examiner—Brian Young
(74) Attorney, Agent, or Firm—Ohlandt, Greeley, Ruggiero & Perle, L.L.P.

(57) ABSTRACT

A circuit manages the conversion of data between a logical sector format and a physical sector format. In a padding mode, the circuit appends a padding value to a data stream in the logical sector format having a logical length to produce a data stream in a physical sector format having a physical length. In an extracting mode, the circuit extracts a data stream in the logical sector format from a data stream in the physical sector format.

21 Claims, 6 Drawing Sheets

HARDWARE APPENDS PADDING DATA TO LOGICAL SECTORS

GENERAL CASE

| LOGICAL_SECTOR #1 | LOGICAL_SECTOR #2 | LOGICAL_SECTOR #3 | ... | LOGICAL_SECTOR #31 | LOGICAL_SECTOR #32 |
|---|---|---|---|---|---|
| PHYSICAL_SECTOR #1 | PHYSICAL_SECTOR #2 | PHYSICAL_SECTOR #3 | ... | PHYSICAL_SECTOR #31 | PHYSICAL_SECTOR #32 |

310 ← 350, INTERRUPT

FIG.3A

EXEMPLARY APPLICATION

| LOGICAL_SECTOR #1 | LOGICAL_SECTOR #2 | LOGICAL_SECTOR #3 | ... | LOGICAL_SECTOR #31 | LOGICAL_SECTOR #32 |
|---|---|---|---|---|---|
| 2056 BYTES | 2056 BYTES | 2056 BYTES | ... | 2056 BYTES | 2056 BYTES |
| 2054 BYTES | 2054 BYTES | 2054 BYTES | | 2054 BYTES | 2054 BYTES |

| 514 | 514 | 514 | 514 | 514 |   | 514 | 514 | 514 | 514 | 514 |
|---|---|---|---|---|---|---|---|---|---|---|
| 1 | 2 | 3 | 4 | 5 | 6 | 7 | 8 | 9 | 10 | 11 | 12 |

| 514 | 514 | 514 | 514 | 514 |
|---|---|---|---|---|
| 121 | 122 | 123 | 124 | 125 | 126 | 127 | 128 |

← 350A, INTERRUPT

FIG.3B

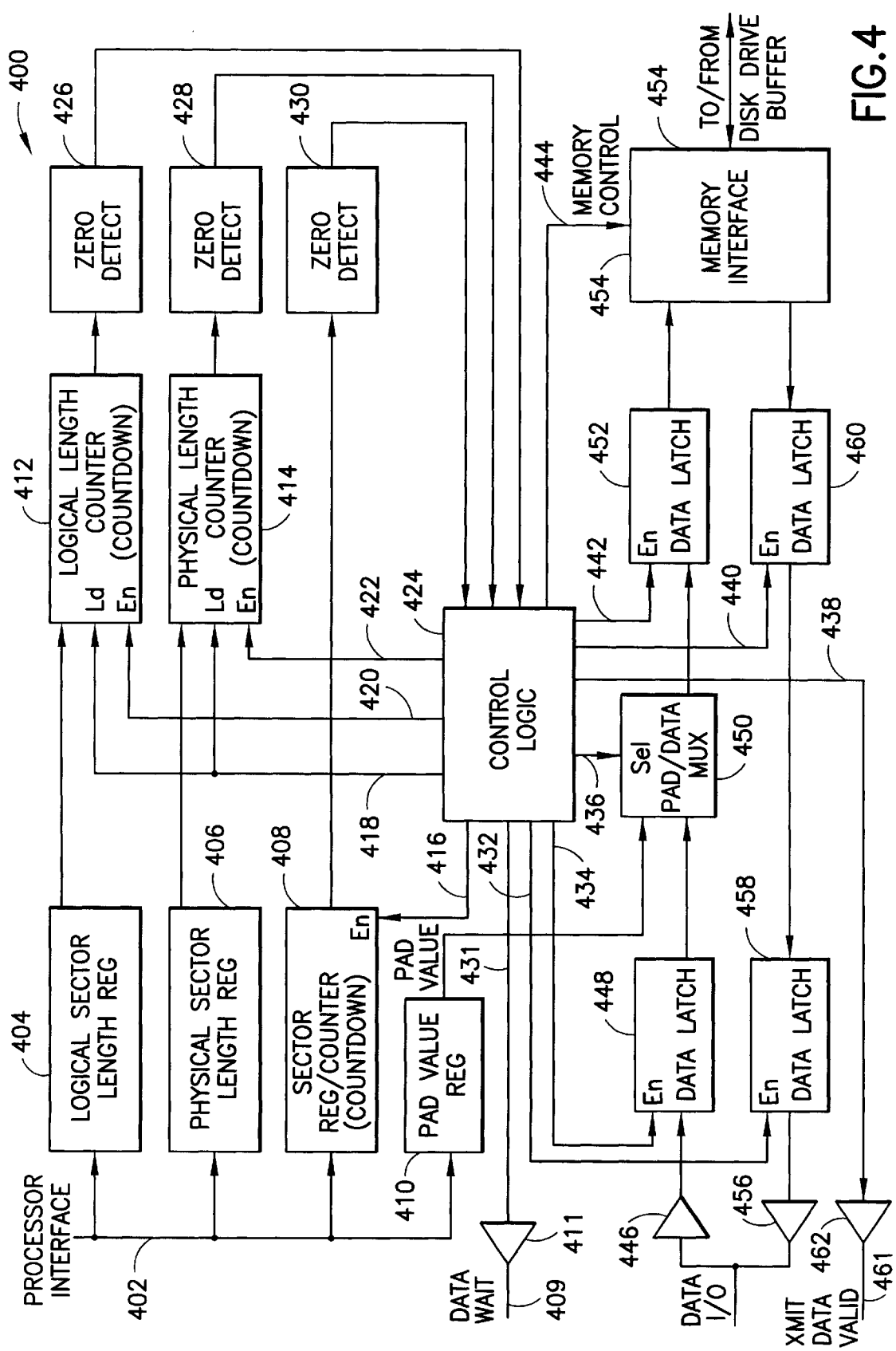

USE OF COUNTERS BY HARDWARE
TO
APPENDS PADDING DATA TO LOGICAL SECTORS

| SECTOR COUNT | | | 31 | | | | 30 | | |
|---|---|---|---|---|---|---|---|---|---|
| LOGICAL LENGTH COUNT | 3 | 2 | 1 | 0 | 0 | 0 | 2053 | 2052 | 2051 |
| PHYSICAL LENGTH COUNT | 5 | 4 | 3 | 2 | 1 | 0 | 2055 | 2054 | 2053 |
| | DATA | DATA | DATA | DATA | DATA | DATA | DATA | DATA | DATA |

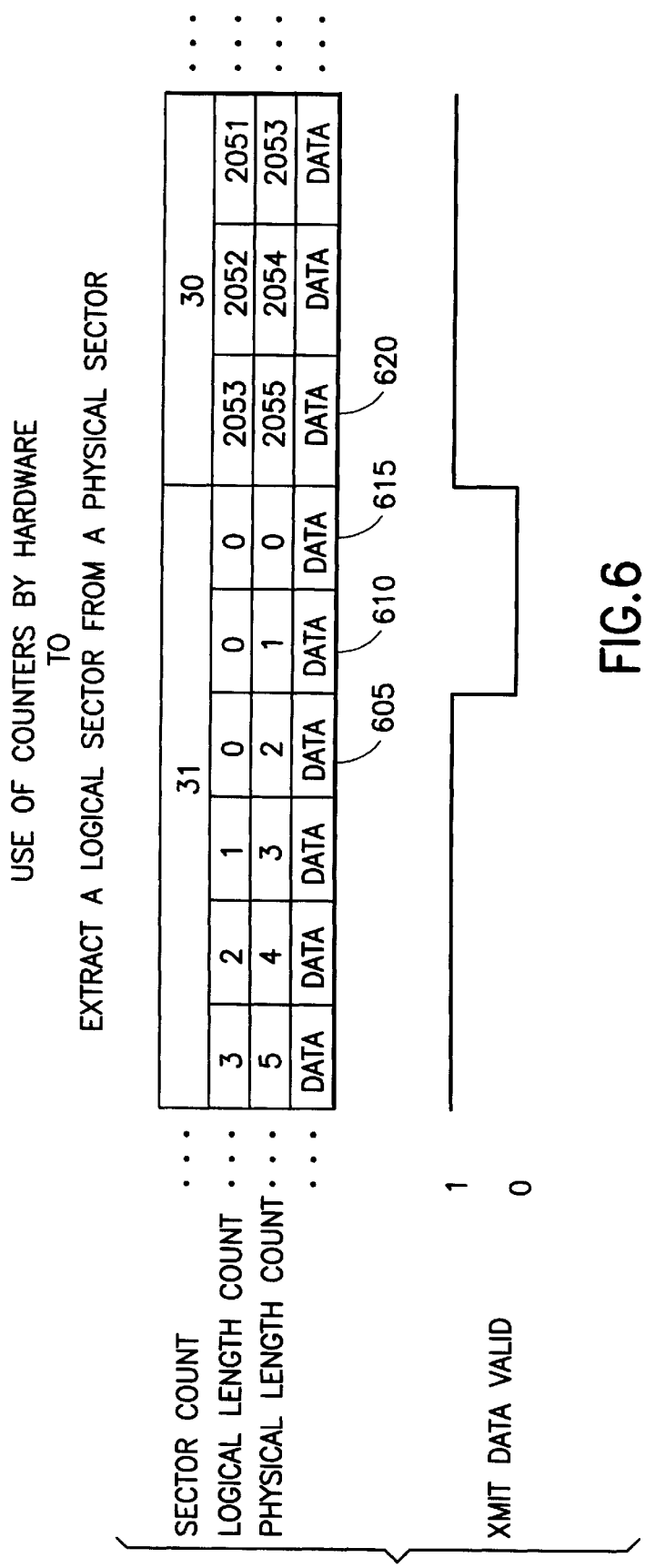

CIRCUIT FOR ALIGNING LOGICAL SECTORS WITH PHYSICAL SECTORS IN A DISK STORAGE SYSTEM

FIELD OF THE INVENTION

The present invention relates to disk storage systems and more particularly, to a circuit for appending padding data to, and extracting padding data from, a logical sector in order to align a boundary of the logical sector to a boundary of a physical sector.

BACKGROUND OF THE INVENTION

Data on a typical disk storage system is organized into physical sectors, each containing a predetermined number of consecutive bytes. When data is written to a disk drive or read from the disk drive, the quantity of data transferred must be in units of physical sectors, and all data transfers must start and end on a boundary of a physical sector. For example, if a physical sector is comprised of 514 bytes, a data transfer can involve 514 bytes, 1028 bytes, 1542 bytes, etc.

When a processor accesses a disk drive, such as when writing a file, the processor most likely does not need to operate on exactly one physical sector or an integer multiple thereof. Instead, the processor will probably require some quantity of data other than, for example, 514 bytes, 1028 bytes, 1542 bytes, etc.

In the context of transferring data between a processor and a data storage system, the data operated upon by the processor is referred to as a logical sector. As shown above, the boundary of a logical sector does not typically align with the boundary of a physical sector. Consequently, a data transfer often involves the manipulation of more data than is actually to be used by the processor.

Design objectives of a disk storage system usually include maximizing recording density and throughput. Recording density is a ratio of the memory occupied by valid data to the total memory capacity of the disk storage system. Throughput is a measure of the total amount of work processed by a system during a specified period of time.

The following patents are representative of prior art techniques that attempt to maximize recording density and throughput. Generally, they are directed towards systems or methods for either organizing data on a disk drive, or managing the misalignment of logical and physical sector boundaries.

U.S. Pat. No. 5,596,458 to Emo et al., entitled Variable Zone Layout For Information Storage Disk Drive, describes a method and system for improving recording density by measuring the performance characteristics of the individual read/write heads for a disk having a plurality of disk surfaces. Zone boundaries are established for each disk surface based on the performance characteristics, and on the frequency at which data is read from, and written to, a particular zone. The zone boundaries on the surfaces of the disks will not necessarily be vertically aligned. Recording density is improved by reducing the read/write frequency of those heads with a performance characteristic of less than a predetermined level.

U.S. Pat. No. 5,671,439 to Klein et al., entitled Multi-Drive Virtual Mass Storage Device And Method Of Operating Same, describes a virtual mass storage device that is organized into blocks allocated to different physical devices. The physical devices operate in parallel to increase the overall transfer rate of the virtual device.

U.S. Pat. No. 5,765,201 to Manges et al., entitled Changing Page Size In Storage Media Of Computer System, describes an invention that applies to a system in which data is stored in blocks or sectors defined by headers. Tables are used to define memory objects and segments, and to locate virtual memory addresses in physical memory. The headers and tables can be changed without rewriting all the data in the sectors or pages in physical memory. Accordingly, the page size can also be changed to accommodate new system components.

U.S. Pat. No. 5,802,584 to Kool et al., entitled Hardware Alignment In A Headerless Disk Drive Architecture, discloses a system for controlling the transfer of data to and from physical sectors of a disk drive. The system includes a disk controller that decodes an event control word, and a counter that increments as a read/write head passes over a sector on the disk. The counter indicates the position of the read/write head by indicating the data frame over which the head is positioned. An alignment processor scans the control words to locate a control word corresponding to the data frame indicated by the counter. During the scanning, the alignment processor also aligns logical and physical sector counters as indicated by the position of the read/write head. Thereafter, the disk controller uses the aligned values and begins decoding the control words and controlling the data transfer.

U.S. Pat. No. 5,813,025 to Murphy et al., entitled System And Method For Providing Variable Sector-Format Operation To A Disk Access System, describes a system and method for processing I/O requests between a predetermined logical sector format and a variable physical sector format. For a read operation starting in the middle of a physical sector, the data preceding the first logical sector is discarded, and the user requested data is stored in a user buffer. For a write operation to a logical sector located in the middle of a physical sector, the physical sector is read, modified according to the write request to the logical sector, and then written back to the disk as a complete physical sector. A buffer is maintained for holding the data that is read and subsequently modified prior to writing back to the disk.

FIG. 1 illustrates a relationship between logical and physical sectors according to the prior art. A data stream on a disk drive is organized into physical sectors 1–128, of 514 bytes each, which hold logical sectors #1–#32 of 2054 bytes each.

Logical sectors #1–#32 have been written from a processor to the disk drive as a continuous data stream, that is, without gaps or filler between logical sectors. This is a technique used for improving recording density, which is adversely affected by factors such as the presence of invalid or excess data between valid occurrences of data.

Note that four physical sectors total 2056 bytes in length, and that four physical sectors are required to accommodate each logical sector of 2054 bytes. For example, logical sector #1 resides in physical sectors 1–4. Since the 2056-byte length of four physical sectors is two bytes greater than the 2054-byte length of a logical sector, logical sector #1 ends, and logical sector #2 starts, two bytes from the end of physical sector 4. Logical sector #2 then ends four bytes from the end of physical sector 8. That is, logical sector #2 starts at physical sector 4, byte 512, and ends at physical sector 8, byte 510. This two-byte difference accumulates so that logical sector #32 ends 64 bytes, i.e., 32×2 bytes, before the end boundary of physical sector 128.

When writing a data stream of 32 logical sectors to the disk drive, a processor must append 64 bytes of padding data to the end of logical sector #32. Upon completion of the write operation, the disk drive issues an interrupt 105 to the processor. After receiving interrupt 105, the processor issues another set of 32 logical sectors to the disk drive.

The subtleties of the relationship between the logical and physical sectors become more apparent when reading data from the disk drive. By way of example, assume that a processor wishes to read logical sector #2. The processor must determine the address of logical sector #2 and recognize that it starts at physical sector 4, byte 512 and ends at physical sector 8, byte 510. Since the disk drive can only transfer data in units of physical sectors, and all data transfers must start and end on a boundary of a physical sector, the disk drive must read all of physical sectors 4–8, inclusive. The processor must then discard excess data. In particular, it must discard data from physical sector 4, bytes 1–511, and physical sector 8, bytes 513 and 514. One of the problems with a system in which logical sectors are not aligned with physical sectors, as shown in FIG. 1, is that the manipulation of excess data decreases the overall throughput of the system.

Another prior art technique for dealing with the misalignment of logical and physical sector boundaries is to pad each of the logical sectors to extend their lengths to that of the physical sectors. Although this operation is relatively straight forward, it is typically implemented in software, and this implementation is accompanied by the consequences discussed below.

FIG. 2 illustrates the effect of padding a logical sector using software. A data stream on a disk drive is organized into physical sectors 1–128, of 514 bytes each, which hold logical sectors #1–#32 of 2054 bytes each. Four physical sectors totaling 2056 bytes in length are required to accommodate each logical sector of 2054 bytes. For example, logical sector #1 resides in physical sectors 1–4. Since the 2056-byte length of physical sectors 1–4 is two bytes greater than the 2054-byte length of a logical sector #1, logical sector #1 ends two bytes from the end of physical sector 4. These 2 bytes are occupied by padding data 205 that has been appended by software to the end of logical sector #1. The start of logical sector #2 aligns with the start of physical sector 5.

The data stream represented in FIG. 2 is not a continuous data stream. During a write operation, a processor prepares 2054 bytes of data for logical sector #1, appends 2 bytes of padding data 205, and then issues the data to the disk drive. Upon completion of the write operation, the disk drive issues an interrupt 210 to the processor. After receiving interrupt 210, the processor issues logical sector #2 with appended data 215 to the disk drive. Upon completion of this write operation, the disk drive issues interrupt 220 to the processor.

Interrupt handlers divert the processor from other tasks and often involve substantial overhead for setting up to service the interrupt. One of the problems with a system in which software appends padding data to the end of logical sectors, as shown in FIG. 2, is that the disk drive interrupts the processor after every write operation.

Accordingly, it is an object of the present invention to provide an improved system, implemented in hardware, that, when writing to a disk drive, appends padding data to a logical sector to align the end boundary of the logical sector with the end boundary of a physical sector.

It is another object of the present invention to provide an improved system, implemented in hardware, that, when reading data from a hard drive, removes padding data from a physical sector to yield a logical sector.

It is yet another object of the present invention to provide an improved system, implemented in hardware, that accommodates logical and physical sectors of variable lengths by appending and extracting padding data of variable lengths.

SUMMARY OF THE INVENTION

A circuit manages the conversion of data between a logical sector format and a physical sector format. In a padding mode, the circuit appends a padding value to a logical data stream, in which logical sectors have a logical length, to produce a physical data stream in which physical sectors have a physical length. In an extracting mode, the circuit extracts a logical data stream from a physical data stream.

In the padding mode, the circuit includes a switch, a logical length counter, a physical length counter and a controller. The switch has an input for receiving the logical data stream, an input for receiving a padding value, and an output for transmitting the physical data stream. The logical length counter counts bytes of the logical data stream and the physical length counter counts bytes of the physical data stream. A controller controls the switch to select the logical data stream until the logical length is counted, and then controls the switch to select the padding value until the physical length is counted.

In the extracting mode, the circuit includes a data latch, a logical length counter and a physical length counter. The data latch has an input for receiving the physical data stream, and an output for transmitting the logical data stream. The logical length counter counts bytes of the logical data stream and the physical length counter counts bytes of the physical data stream. A controller enables the data latch to receive the physical data stream until the logical length is counted, and disables the data latch until the physical length is counted.

BRIEF DESCRIPTION OF THE DRAWINGS

FIGS. 3A and 3B show the effect of padding a logical sector in hardware according to the present invention;

FIG. 4 is a schematic diagram of a logic circuit for appending and extracting a padding value from a logical sector according to the present invention;

FIG. 5 shows the use of counters by hardware to append a padding value to a logical sector according to the present invention; and FIG. 6 shows the use of counters by hardware to extract a logical sector from a physical sector according to the present invention.

DETAILED DESCRIPTION OF THE INVENTION

Figure 1:
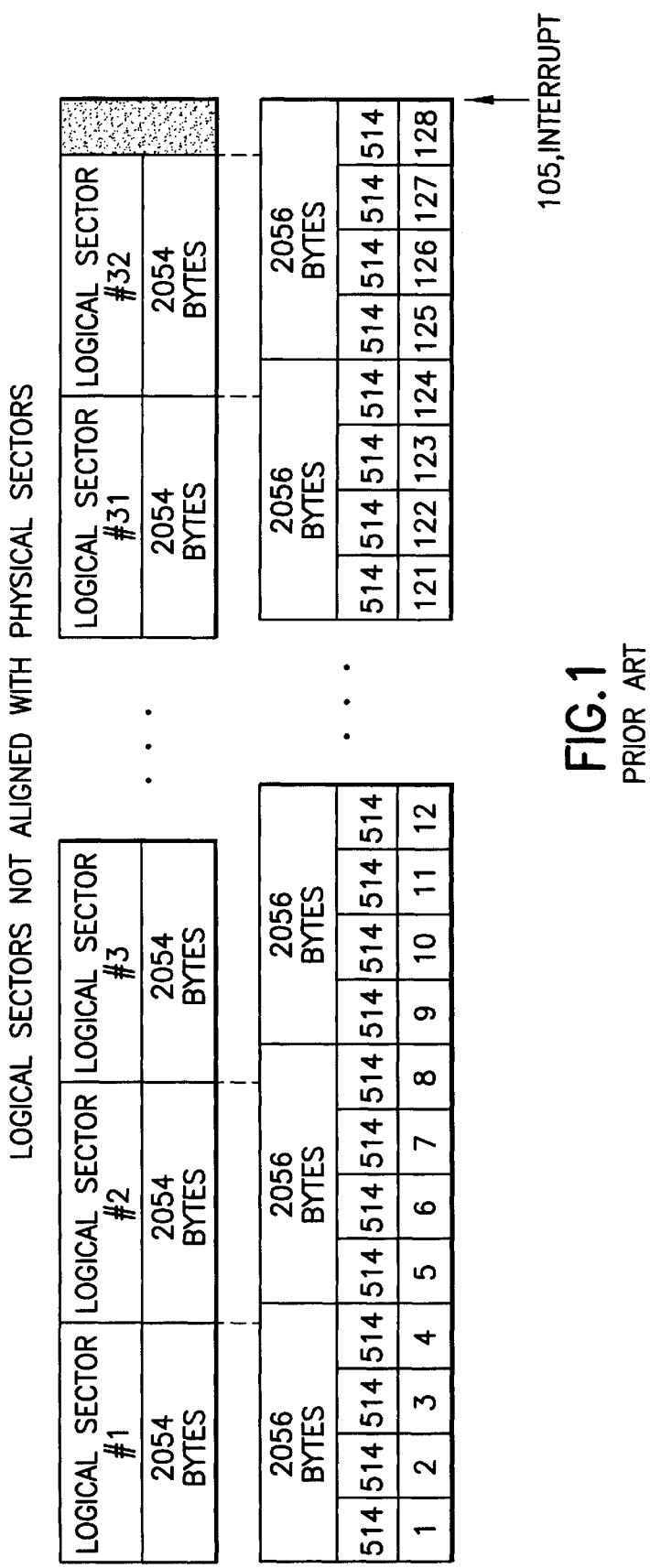
FIG. 1 illustrates misaligned logical and physical sectors according to the prior art.
Figure 2:
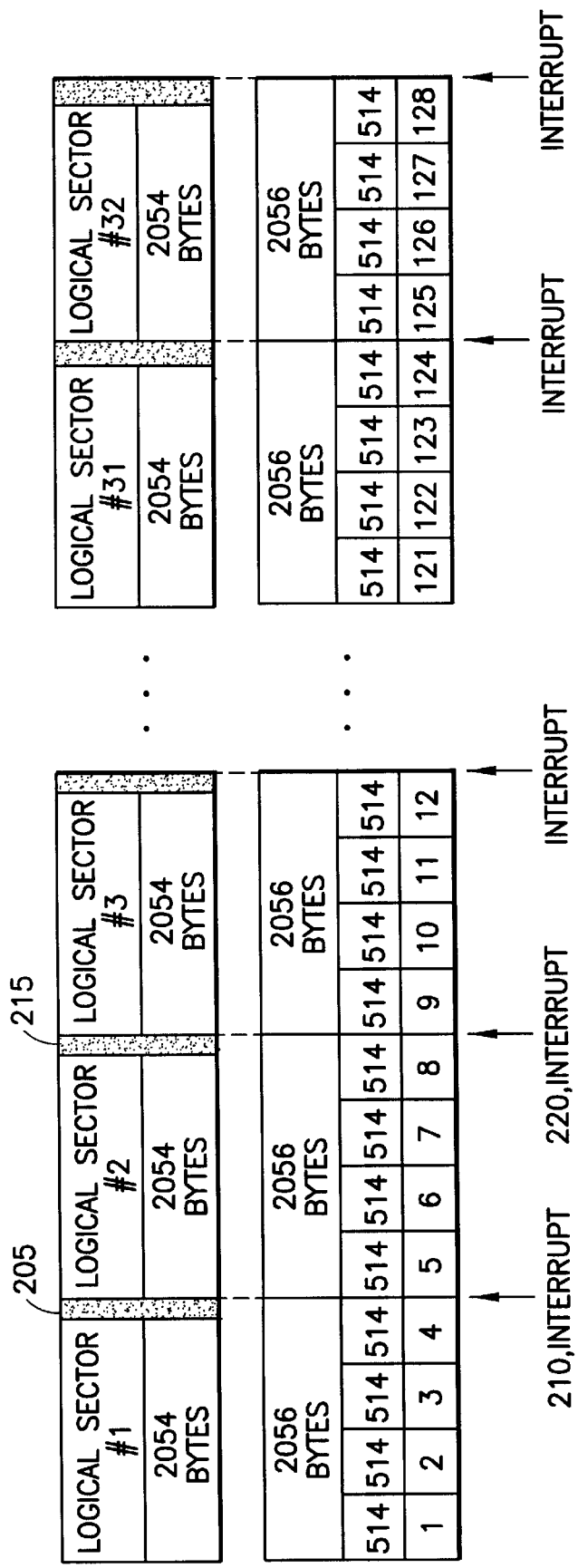
FIG. 2 illustrates the effect of padding a logical sector in software according to the prior art.

The present invention is a circuit for appending padding data to, and extracting padding data from, a logical sector in order to align a boundary of the logical sector to a boundary of a physical sector. First, the conceptual operation of the circuit is set forth in a discussion of FIGS. 3A and 3B. Then the circuit itself is described in the discussion accompanying FIGS. 4–6.

FIGS. 3A and 3B show the effect of padding a logical sector in hardware according to the present invention. FIG. 3A shows a general case, and FIG. 3B shows an exemplary application of the present invention.

In FIG. 3A, a data stream on a disk drive is organized into physical sectors 1–32, which hold logical sectors 1–32 of data that has been issued from a processor. Padding data is appended to the end of each logical sector so that the start of the next logical sector aligns with the start of the next physical sector. For example, padding data 310 is appended to logical sector #1 so that the start of logical sector #2 aligns with the start of physical sector #2. The padding data is appended to each logical sector by a circuit that is operatively located between the processor and the disk drive.

During a write operation, the processor prepares logical sectors 1–32 as a continuous data stream. The processor issues the data stream to the circuit. The circuit passes the data stream to the disk drive and appends padding data at the end of each logical sector. The disk drive writes the data stream as it is received from the circuit. After writing the full data stream, the disk drive issues interrupt 350 to the processor. The processor may thereafter issue another data stream to the circuit.

Since the invention is implemented by a circuit, rather than by software in the processor, the prior art problem of servicing multiple interrupts is alleviated and system throughput is enhanced.

FIG. 3B shows the effect of the present invention in a practical application. A data stream on a disk drive is organized into physical sectors 1–128, of 514 bytes each, which hold logical sectors #1–#32 of 2054 bytes each. Four physical sectors totaling 2056 bytes in length are required to accommodate each logical sector of 2054 bytes. For example, logical sector #1 resides in physical sectors 1–4. Since the 2056-byte length of physical sectors 14 is two bytes greater than the 2054-byte length of a logical sector #1, logical sector #1 ends two bytes from the end of physical sector 4. The circuit, according to the present invention, appends two bytes of padding data to the end of logical sector #1 so that the start of logical sector #2 aligns with the start of physical sector #5. Likewise, logical sector #2 ends two bytes from the end of physical sector 8. The circuit appends two bytes of padding data to the end of logical sector #2 so that the start of logical sector #3 aligns with the start of physical sector #9.

During a write operation, the processor prepares logical sectors #1 through #32 as a continuous data stream. The processor issues the data stream to the circuit. The circuit passes the data stream to the disk drive and appends two bytes of padding data to the end of each logical sector. The disk drive writes the data stream as it is received from the circuit. After writing the full data stream, the disk drive issues interrupt 350a to the processor. The processor may thereafter issue another data stream to the circuit.

A read operation is best described by way of example. Assume that a processor wishes to read logical sector #2. The processor must determine the address of logical sector #2 and recognize that it starts at physical sector 5 and ends at physical sector 8. Since the disk drive can only transfer data in units of physical sectors, and all data transfers must start and end on a boundary of a physical sector, the disk drive must read all of physical sectors 4–8, inclusive.

The disk drive sends physical sectors 4–8 to the circuit. The last two bytes of data from physical sector 8 contain padding data that were appended by the circuit during a write operation. During reading, the circuit will discard the two bytes of padding data and pass logical sector #2 to the processor without any excess data.

FIG. 4 is a schematic diagram of a logic circuit 400 for appending and extracting a padding value from a logical sector according to the present invention. The principal components of the circuit are control logic 424, logical length counter 412, physical length counter 414, pad/data multiplexer (mux) 450 and data latch 458. Also included are a logical sector length register 404, physical sector length register 406, sector register/counter 408, pad value register 410, zero detects 426, 428 and 430, buffers 446, 456, and 462, data latches, 448, 452 and 460, and memory interface 454.

A processor interface bus 402 provides a path for signals from a processor (not shown) to logical sector length register 404, physical sector length register 406, sector register/counter 408 and pad value register 410. The output of logical sector register 404 is coupled to an input of logical length counter 412. The output of physical sector length register 406 is coupled to an input of physical length counter 414. The output of pad value register 410 is coupled to an input of pad/data mux 450.

The outputs of logical length counter 412, physical length counter 414 and sector register/counter 408 are coupled to inputs of zero detects 426, 428 and 430, respectively. The outputs of zero detects 426, 428 and 430 are coupled to inputs of control logic 424.

A data stream from the processor is received by buffer 446 and is coupled through data latch 448 to pad/data mux 450. Data proceeds from the output of pad/data mux 450, through data latch 452 to memory interface 454, which sends the data to a disk drive buffer (not shown).

A data stream from the disk drive buffer is received by memory interface 454, and is routed to data latch 460. The output of data latch 460 is coupled to data latch 458. The output of data latch 458 is coupled to buffer 456, which sends data to the processor.

Control logic 424 produces several signals to control the operation circuit 400. An enable signal 416 enables the counting function of sector register/counter 408. A load signal 418 controls/logical length counter 412 and physical length counter 414 to load values from logical sector length register 404 and physical sector length register 406, respectively. Enable signals 420 and 422 enable the counting functions of logical length counter 412 and physical length counter 414, respectively. Memory control signal 444 directs the operation of memory interface 454. Enable signals 432, 434, 440 and 442 control the loading of data into data latches 458, 448, 460 and 452, respectively. Select signal 436 controls pad/data mux 450 to input data from either data latch 448 or pad value register 410. Control logic 424 also produces a data wait signal 431 that is routed through buffer 411 to produce data wait signal 409. A data validation signal 438 is routed through buffer 462.

Circuit 400 has a padding mode and an extracting mode. In the padding mode, circuit 400 receives a data stream of logical sectors (logical data stream), and appends padding data to the end of each logical sector to yield a data stream of physical sectors (physical data stream). In the extracting mode, circuit 400 receives a data stream of physical sectors, and suppresses padding data to extract a data stream of logical sectors. The details of the operation of each of the two modes is set forth below.

The function of several components is relevant to the operation of both the padding mode and the extracting mode. The operation of these components is discussed first, before examining the operation of the individual modes.

Logical sectors have a logical length of a predetermined number of bytes, and physical sectors have a physical length of a predetermined number of bytes. The logical length and physical length are programmable by the processor. Via processor interface bus 402, the processor loads the logical length into logical sector length register 404, and loads the physical length into physical sector length register 406. The processor specifies the number of sectors to be transferred to or from the disk drive by loading the number of sectors into sector register/counter 408. The processor also specifies a value for the padding data by loading a padding value into pad value register 410.

In either mode of operation, to transfer an individual data sector, control logic 424 controls logical length counter 412 to load the logical length from logical sector length register 404, and controls physical length counter 414 to load the physical length from physical sector length register 406. During data transfers control logic 424 enables logical length counter 412, physical length counter 414 and sector register/counter 408. Logical length counter 412 decrements one count for each byte of data transferred, and reaches zero when it has counted the logical length. Physical length counter 414 decrements one count for each byte of data transferred, and reaches zero when it has counted the physical length. Similarly, sector register/counter 408 decrements one count for each sector of data transferred, and reaches zero when all sectors have been transferred. Zero detects 426, 428 and 430 monitor the counts of logical length counter 412, physical length counter 414 and sector register/counter 408, respectively, and notify control logic 424 when their respective counters have reached a count of zero.

Control logic 424 manages the transfer of multiple sectors by indirectly monitoring the condition of physical length counter 414 and sector register/counter 408 via their respective zero detectors 428 and 430. When physical length counter 414 reaches zero, a sector has been completely transferred. In response, via enable signal 416, control logic 424 enables sector register/counter 408 to decrement by one count. If sector register/counter 408 has not yet decremented to zero, then more sectors must be transferred, and via load signal 418, control logic 424 reloads logical length counter 412 from logical length sector register 404, and reloads physical length counter 414 from physical sector length register 406.

In the padding mode, control logic 424 manages data wait signal 431, which is coupled through buffer 411 to yield data wait signal 409, for controlling the transmission of a logical data stream from a processor. Initially, data wait signal 431 is not set. Therefore, the processor is permitted to transmit the logical data stream to buffer 446, and the data is latched into data latch 448. The logical data stream is routed from data latch 448 to an input of pad/data mux 450.

Control logic 424 indirectly monitors logical length counter 412 through zero detect 426, and via select signal 436, controls pad/data mux 450 to select the logical data stream from data latch 448 until logical length counter 412 reaches zero. Thereafter, control logic 424 indirectly monitors physical length counter 414 through zero detect 428. Control logic 424 inhibits the transmission of data from the processor by issuing data wait signal 431, and via select signal 436, controls pad/data mux 450 to select the pad value from pad value register 410 until physical length counter 414 reaches zero. The output of pad/data mux 450 is a physical data stream, that is, a data stream consisting of logical sectors with appended padding data where the combined length of a logical sector and its padding data is the length of a physical sector.

The physical data stream out of pad/data mux 450 is routed to data latch 452, and thereafter, to memory interface 454. Via memory control signal 444, control logic 424 directs memory interface 454 to send the physical data stream to the disk drive buffer.

In the extracting mode, a physical data stream is received from the disk drive buffer through memory interface 454 and latched into data latch 460. The physical data stream is then routed from data latch 460 to data latch 458.

Control logic 424 indirectly monitors logical length counter 412 through zero detect 426, and via enable signal 432, controls data latch 458 to input data from data latch 460 until logical length counter 412 reaches zero. Thereafter, control logic 424 indirectly monitors physical length counter 414 through zero detect 428, and via select signal 436, disables data latch 458 until physical length counter 414 reaches zero. The output of data latch 458 is a logical data stream, that is, a data stream consisting of logical sectors that have been extracted from physical sectors whose padding values have been suppressed.

The logical data stream out of data latch 458 is routed through buffer 456 to the processor. Control logic 424 generates data validation signal 438 during the time that the output of data latch 458 is transmitting a valid logical data stream. Data validation signal 438 is coupled through buffer 462 and sent to the processor as transmit (xmit) data valid signal 461.

FIG. 5 shows the use of hardware counters for appending a padding value to a logical sector. It shows a case where a logical sector with a length of 2054 bytes is received from a processor, and a physical sector with a length of 2056 bytes is sent to a disk drive. Logical length counter (FIG. 4, reference 412) and physical length counter (FIG. 4, reference 414) are each counting down toward zero, one count for each byte of the data stream that is being transferred. At step 505, logical length counter 412 reaches a count of zero, indicating that it has counted one logical sector. Physical length counter 414 continues to count down until step 515 when it reaches a count of zero. Note that two bytes of padding data are appended to the data stream.

At step 520, sector register/counter (FIG. 4, reference 408) decrements by one count, and logical length counter 412, and physical length counter 414 are reloaded and thereafter enabled to count down while the next sector is transferred. Those skilled in the art will understand that the counters are actually loaded with a value of one less than the number of bytes to be counted because the counters decrement to terminal values of zero.

FIG. 6 shows the use of counters for extracting a logical sector from a physical sector by hardware according to the present invention. A physical sector with a length of 2056 bytes is received from a disk drive, and a logical sector with a length of 2054 bytes is sent to a processor. Logical length counter (FIG. 4, reference 412) and physical length counter (FIG. 4, reference 414) are each counting down toward zero, one count for each byte of a data stream that is being transferred. The xmit data valid signal (FIG. 4, reference 461) is a logical 1 while valid data is being sent to the processor. At step 605, logical length counter 412 reaches a count of zero, indicating that it has counted one logical sector. In step 610, the xmit data valid signal 461 changes to a logical 0 while the padding values of the data stream are being received from the disk drive. Physical length counter 414 continues to count down until step 615 when it reaches a count of zero.

At step 620, sector register/counter (FIG. 4, reference 408) decrements by one count, and logical length counter 412, and physical length counter 414 are reloaded and thereafter enabled to count down while the next sector is transferred. The xmit valid data signal 461 changes back to a logical 1 to indicate that valid data is, once again, being transferred.

It should be understood that the foregoing description is only illustrative of the invention. Various alternatives and modifications can be devised by those skilled in the art without departing from the invention. For example, data latches or buffers can be configured to alter the sequence by which data is routed through the circuit, and the timing relationships of the various control signal can be modified. Also, the data stream being transferred can be in data units other than bytes, and the data lines may be configured as serial links or parallel busses. Accordingly, the present invention is intended to embrace all such alternatives, modifications and variances that fall within the scope of the appended claims.

What is claimed is:

1. A circuit for appending a padding value to a first data stream having a logical length, to produce a second data stream that when recorded in a recording device will occupy a determined physical length on said recording device that matches an operating requirement of said recording device, said logical length and said physical length measured in data units, said circuit comprising:

a switch having a first input for receiving said first data stream, a second input for receiving said padding value, and an output for transmitting said second data stream, said switch controllable to route either said first input or said second input to said output;

a logical length counter to count data units of said first data stream, and having an output indicating when said logical length has been counted;

a physical length counter to count data units of said second data stream, and having an output indicating when said physical length has been counted;

a controller, responsive to said outputs from said logical length counter and said physical length counter, for controlling said switch to select said first data stream until said logical length has been counted, and then to control said switch to select said padding value until said physical length has been counted.

2. The circuit recited in claim 1, further comprising a data latch having an input for receiving said second data stream from said output of said switch, and an output for transmitting said second data stream, said data latch controllable to enable or disable said input for receiving said second data stream.

3. The circuit recited in claim 1, further comprising a sector counter to count sectors of said second data stream, and having an output indicating when said sectors have been counted.

4. The circuit recited in claim 1, further comprising a logical length register for holding a value representing said logical length, wherein said logical length counter is loaded from said logical length register.

5. The circuit recited in claim 1, further comprising a physical length register for holding a value representing said physical length, wherein said physical length counter is loaded from said physical length register.

6. The circuit recited in claim 1, further comprising a padding value register for holding said padding value, wherein said second input of said switch receives said padding value from said padding value register.

7. The circuit recited in claim 1, wherein said data unit is a byte.

8. A circuit for extracting a first data stream having a logical length, from a second data stream having a determined physical length that matches an operating requirement of a recording device, said logical length and said physical length measured in data units, said circuit comprising:

a data latch having an input for receiving said second data stream, and an output for transmitting said first data stream, said data latch controllable to enable or disable said input for receiving said second data stream;

a logical length counter to count said data units of said first data stream, and having a n output indicating when said logical length has been counted;

a physical length counter to count said data units of said second data stream, and having an output indicating when said physical length has been counted;

a controller, responsive to said outputs from said logical length counter and said physical length counter, for controlling said data latch to enable said input for receiving said second data stream until said logical length has been counted, and then to control said data latch to disable said input for receiving said second data stream until said physical length has been counted.

9. The circuit recited in claim 8, further comprising a sector counter to count sectors of said second data stream, and having an output indicating when said sectors have been counted.

10. The circuit recited in claim 8, further comprising a logical length register for holding a value representing said logical length, wherein said logical length counter is loaded from said logical length register.

11. The circuit recited in claim 8, further comprising a physical length register for holding a value representing said physical length, wherein said physical length counter is loaded from said physical length register.

12. The circuit recited in claim 8, wherein said controller provides an output indicating that said output of said data latch is transmitting said first data stream.

13. The circuit recited in claim 8, wherein said data unit is a byte.

14. A circuit, capable of operating in a padding mode or an extracting mode, said padding mode for appending a padding value to a first data stream having a logical length, to produce a second data stream that when recorded in a recording device will occupy a determined physical length on said recording device that matches an operating requirement of said recording device, and said extracting mode for extracting said first data stream from said second data stream, said logical length and said physical length measured in data units, said circuit comprising:

a switch having a first input for receiving said first data stream, a second input for receiving said padding value, and an output for transmitting said second data stream, said switch controllable to route either said first input or said second input to said output;

a first data latch having an input for receiving said second data stream, and an output for transmitting said first data stream, said first data latch controllable to enable or disable said input for receiving said second data stream;

a logical length counter to count said data units of said first data stream, and having an output indicating when said logical length has been counted;

a physical length counter to count said data units of said second data stream, and having an output indicating when said physical length has been counted;

a controller, responsive to said outputs from said logical length counter and said physical length counter, wherein in said padding mode, said controller controls said switch to select said first data stream until said logical length has been counted, and then to control said switch to select said padding value until said physical length has been counted; and in said extracting mode, said controller controls said first data latch to enable said input for receiving said second data stream until said logical length has been counted, and then to control said first data latch to disable said input for receiving said second data stream until said physical length has been counted.

15. The circuit recited in claim 14, further comprising a second data latch having an input for receiving said second data stream from said output of said switch, and an output for transmitting said second data stream, said second data latch controllable to enable or disable said input for receiving said second data stream.

16. The circuit recited in claim 14, further comprising a sector counter to count sectors of said second data stream, and having an output indicating when said sectors have been counted.

17. The circuit recited in claim 14, further comprising a logical length register for holding a value representing said logical length, wherein said logical length counter is loaded from said logical length register.

18. The circuit recited in claim 14, further comprising a physical length register for holding a value representing said physical length, wherein said physical length counter is loaded from said physical length register.

19. The circuit recited in claim 14, further comprising a padding value register for holding said padding value, wherein said second input of said switch receives said padding value from said padding value register.

20. The circuit recited in claim 14, wherein said controller provides an output indicating that said output of said first data latch is transmitting said first data stream.

21. The circuit recited in claim 14, wherein said data unit is a byte.

* * * * *